United States Patent [19]

Davies et al.

[11] 4,141,974

[45] Feb. 27, 1979

[54] VETERINARY METHOD EMPLOYING CERTAIN AUREOLIC ACID COMPOUNDS

[75] Inventors: David H. Davies; Richard J. Ernill; Geoffrey L. F. Norris, all of Macclesfield, England

[73] Assignee: Imperial Chemical Industries Limited, London, England

[21] Appl. No.: 791,189

[22] Filed: Apr. 27, 1977

[30] Foreign Application Priority Data

May 19, 1976 [GB] United Kingdom ............... 20675/76

[51] Int. Cl.$^2$ .............................................. A61K 31/71
[52] U.S. Cl. ................................ 424/181; 195/80 R; 536/17; 424/119
[58] Field of Search ................................ 424/119, 181

[56] References Cited

U.S. PATENT DOCUMENTS

| | | | |
|---|---|---|---|
| 3,313,691 | 4/1967 | Miyake et al. | 424/119 |
| 3,646,194 | 2/1972 | Sobin et al. | 424/119 |
| 3,906,093 | 9/1975 | Sobin et al. | 424/119 |

*Primary Examiner*—V. D. Turner
*Attorney, Agent, or Firm*—Cushman, Darby & Cushman

[57] ABSTRACT

The disclosure relates to a method for use in the practice of animal husbandry which comprises the oral administration to meat producing animals a compound of the aureolic acid group. Solid and liquid compositions for use in the method are also disclosed, together with a novel process for the manufacture of mixed mithramycins, and an improved process for their purification.

6 Claims, No Drawings

VETERINARY METHOD EMPLOYING CERTAIN AUREOLIC ACID COMPOUNDS

This invention relates to a method and compositions for use in the practice of animal husbandry for improving the growth rate of animals and for improving the efficiency of the utilisation of animal foodstuffs.

According to the invention, there is provided a method for use in the practice of animal husbandry which comprises orally administering to meat-producing domestic animals, for example chickens, turkeys, ducks, geese, pigs, sheep, cattle or rabbits, a compound of the aureolic acid group.

A compound of the aureolic acid group, as the term is used in this specification, is defined to include:

(1) aureolic acid, described by Grundy et al. Antibiotics and Chemotherapy, Volume 3, page 12–15 (1953), and by Philip et al., ibid, page 1218, which has also been described as LA 7017 by Sensi et al., ibid, Volume 8, page 241 (1958), and as mithramycin in U.S. Pat. No. 3,906,093, which also describes the separation of three forms identified as mithramycins A, B and C.

(2) a mixture of any two, or all three, of mithramycins A, B and C;

(3) aburamycins A, B, C and D, described by Nishimura et al., Journal of Antibiotics (Tokyo), Series A10, page 205 (1957), of which A, B and D respectively have also been described as chromomycins $A_2$, $A_3$ and $A_4$, by Shibata et al., ibid., Series $B_{13}$, page 1 (1960);

(4) a mixture of any two or more of aburamycins A, B, C and D;

(5) a mixture of any two, or all three, of chromomycins $A_2$, $A_3$ and $A_4$, including those described as SK 229 by Yoshida, Annual Reports of Shionogi Research Laboratories, volume 15, page 212 (1965), and as M5-18903 by Gale et al., Antibiot. Ann., page 489 (1958);

(6) olivomycins A, B, C and D, described by Gauze et al., Antibiotiki, volume 7, page 34 (1962) and by Braznihikova et al., ibid., page 39;

(7) a mixture of any two or more of olivomycins A, B, C and D, including that described as NSC A-649 by Schmitz et al., Antibiotics and Chemotherapy, volume 10, page 740 (1960);

(8) antibiotics 232, 2014, 7193 and 11296 described by Ukholina et al., Mikrobiologia, volume 34, page 147 (1965);

(9) a single compound, or a mixture of compounds, obtained from the fermentation of *Streptomyces pilosus*, NCIB 11238;

(10) variamycin, described by Zhdanovich et al., Chemistry of Natural Compounds, volume 7, page 625 (1971);

(11) an ammonium, alkali metal, alkaline earth metal or transition metal salt, complex or chelate of a compound or mixture of compounds described in any of (1) to (10) above, for example the ammonium, sodium, potassium, lithium, magnesium, calcium, barium and copper salts.

In the method of the invention, the compound of the aureolic acid group is preferably orally administered to the animals as a supplement to their diet, that is to say, in admixture with solid food, dissolved in the drinking water or, for young animals such as pigs or calves, dissolved in whole milk or skim milk. It is generally convenient to administer the compound mixed with the animals' normal nutritionally balanced solid diet, and such a supplemented foodstuff should preferably contain from 0.0001% w/w (1g. per tonne) to 0.005% w/w (50g. per tonne) of the compound. The animals may be fed with such a supplemented foodstuff for substantially the whole of their growing period, or for only a part of their growing period, for example the early part, and/or the period leading up to slaughter. The increase in growth rate achieved by the practice of the method of the invention enables animals to be brought to market weight, or slaughter weight, in a shorter growing period than normal, or it enables heavier animals to be produced at the end of the normal growing period.

At optimum growth promoting inclusion levels, no indication of any toxic effect on the animals is observed.

Preferred compounds of the aureolic acid group for use in the method of the invention are the sodium and magnesium salts, chelates or complexes of mithramycin A, and a mixture of mithramycins.

According to a further feature of the invention there is provided a composition, for use in the method of the invention, which comprises a compound of the aureolic acid group, together with a liquid or solid edible non-toxic diluent or carrier.

A suitable liquid diluent or carrier is, for example, drinking water, whole milk or skim milk.

A suitable solid edible non-toxic diluent or carrier may be, for example, a nutritionally balanced animal foodstuff, for example a standard conventional broiler chicken diet of ground grain and grain by-products, and animal protein, supplemented by vitamins and minerals, a standard commercial pig fattening or finishing diet, or other conventional animal foodstuff; or it may be an inert solid diluent or carrier of no nutritional value, for example kaolin, talc, calcium carbonate, fuller's earth, attapulgus clay, ground oyster shells or ground limestone; or it may be starch or lactose.

The composition of the invention may take the form of a supplemented foodstuff suitable for direct feeding to animals, in which case it will preferably contain from 0.0001 to 0.005% w/w of a compound of the aureolic acid group in admixture with a conventional nutritionally balanced animal foodstuff; or it may take the form of a concentrated premix, for dilution with a conventional animal foodstuff to produce a supplemented foodstuff suitable for direct feeding to animals, in which case such a premix will preferably contain from 0.005 to 50% w/w of a compound of the aureolic acid group, in admixture with either a nutritionally balanced animal foodstuff, an inert solid diluent of no nutrional value such as ground limestone, or starch or lactose. Such a premix may be diluted in conventional manner, preferably serially in two or more stages to ensure even mixing.

According to a further feature of the invention, there is provided a process for the manufacture of a solid composition of the invention which comprises evenly dispersing the compound of the aureolic acid group in a solid edible non-toxic diluent or carrier.

According to a further feature of the invention there is provided a process for the manufacture of a mixture of mithramycins which comprises culturing a mithramycin-producing strain of *Streptomyces pilosus* in an aqueous nutrient medium containing sources of assimilable carbon and nitrogen under stirred, aerobic conditions at a temperature between 15° and 45° C., filtering the culture, and isolating the acidic fraction from the filtrate by conventional means.

A suitable mithramycin-producing strain of *S. pilosus* is that deposited at the National Collection of Industrial Bacteria, Mininistry of Agriculture, Fisheries and Food, Torry Research Station, 135 Abbey Road, Aberdeen AB9 8DG, Scotland under the reference NCIB 11238. This strain of *S. pilosus* has the following description:

A. Morphology (Yeast malt agar, 25° C., 8 days)

Aerial mycelium shows simple branching. Spore chains long (more than 10 spores) in spirals (spira). Spore surface (in electron microscope) hairy.

B. Appearance of growth after 12 days at 25° C. on:

1. Yeast malt agar

Typical streptomycete colony. Aerial mycelium at first white, becoming grey as sporulation proceeds (Grey series). Sporulation profuse. Substrate mycelium brown. No diffusible pigment.

2. Starch salts agar

Aerial mycelium pale grey, sporulation poor. Substrate mycelium buff. No diffusible pigment.

3. Glucose asparagine agar

Aerial mycelium grey, sporulation profuse. Substrate mycelium grey. No diffusible pigment.

4. Glycerol asparagine agar

Aerial mycelium grey, sporulation profuse. Substrate mycelium buff. No diffusible pigment.

5. Oatmeal agar

No aerial mycelium. Substrate mycelium white. No diffusible pigment.

6. Sucrose nitrate agar

Aerial mycelium pale grey. Sporulation good. Substrate mycelium grey-buff. No diffusible pigment.

7. Tyrosine agar

Aerial mycelium pale grey. Sporulation good. Substrate mycelium grey. No diffusible pigment.

8. Nutrient agar

Aerial mycelium white. Little sporulation. Substrate mycelium buff, becoming almost black. No diffusible pigment.

9. Iron peptone agar

Aerial mycelium grey-white. Sporulation poor. Substrate mycelium brown, becoming black. Slight diffusible brown pigment (Melanin +, but weak).

10. Melanoid pigment agar

No aerial mycelium. Substrate mycelium dark brown. Slight diffusible brown pigment (Melanin +, but weak).

C. Physiological Properties

Utilization as sole carbon source (in Pridham/Gottlieb agar) of:

| | |
|---|---|
| glucose | + |
| xylose | + |
| arabinose | + |
| rhamnose | + |
| fructose | + |
| galactose | + |
| raffinose | − |
| mannitol | + |

-continued

| | |
|---|---|
| inositol | + |
| salicin | ± (very weak) |
| sucrose | ± (weak) |

Hydrolysis of:

| | |
|---|---|
| Gelatin | + |
| Starch | + |
| Casein (milk agar) | + |

Action in litmus milk

Peptonization and acid production. No solidification.

Growth temperatures

Growth on yeast malt agar after 14 days at:

| 2° | 5° | 10° | 15° | 20° | 25° | 30° | 37° | 45° | 55° |
|---|---|---|---|---|---|---|---|---|---|
| − | − | ± | + | + | + | + | + | + | − |

In the process of the invention, a suitable source of assimilable carbon is, for example, a polyhydric alcohol, for example glycerol, glucose, xylose, arabinose rhamnose, fructose, galactose, mannitol or inositol, and a preferred carbon source is glycerol. Glycerol is conveniently incorporated into the medium at a rate of 2 to 5% w/v.

A suitable source of assimilable nitrogen is, for example, peptone, which is conveniently incorporated at a rate of 0.5 to 2% w/v.

The nutrient medium additionally contains smaller quantities of other elements, such as phosphorus, in the form of, for example, potassium dihydrogen orthophosphate or diammonium hydrogen phosphate; magnesium, in the form of, for example, magnesium sulphate or magnesium carbonate; sulphur, in the form of, for example, a sulphate salt; potassium, in the form of, for example, potassium chloride, potassium carbonate or potassium dihydrogen orthophosphate; and trace quantities of salts of such elements as copper, zinc, iron, manganese and molybdenum.

A suitable temperature for the fermentation is 32° C., and the acidic product may be extracted from the culture filtrate by conventional means, for example by extracting the filtrate with a water-immiscible organic solvent at neutral or basic pH to remove unwanted neutral and basic products, acidifying the aqueous phase and extracting the required acidic product with a water-immiscible organic solvent.

According to a further feature of the invention there is provided an improved process for purifying the acidic product, which comprises converting it to the magnesium chelate or salt thereof by contacting a solution of the acidic product in a water-immiscible organic solvent with magnesium silicate.

The invention is illustrated but not limited by the following Examples:

EXAMPLE 1

*Streptomyces pilosus* NCIB 11238 was grown as a slope culture on four slopes of tryptone-yeast agar medium, in medicine flats, at 32° C. for 7 days. The mycelium and spores from each slope were scraped with sterile water (100 ml.) into a 2 l. flask containing 1 l. of a medium prepared according to the following formula:

| | | |
|---|---|---|
| Glycerol | 5.0% | w/v |
| Peptone (Difco-trade mark) | 0.5% | w/v |
| Calcium carbonate | 0.1% | w/v |
| Potassium dihydrogen orthophosphate | 0.024% | w/v |
| Magnesium sulphate . 7H$_2$O | 0.02% | w/v |
| Minor element concentrate | 0.1% | w/v |
| Deionised water to | 100 | |

The minor element concentrate was prepared as follows:

| | | |
|---|---|---|
| Ferrous sulphate . 7H$_2$O | 0.1% | w/v |
| Cupric sulphate . 5H$_2$O | 0.015% | w/v |
| Zinc sulphate . 7H$_2$O | 0.1% | w/v |
| Manganese sulphate . 4H$_2$O | 0.01% | w/v |
| Potassium molybdate | 0.01% | w/v |
| Deionised water to | 100 | |

The salts are added to part of the deionised water, and the mixture was acidified with sufficient concentrated hydrochloric volume with deionised water. The solution was then sterilised by autoclaving at 15 p.p.s.i. for ½ hour.

The four 2 l. flasks thus prepared were shaken at 32° C. for 2 days on an orbital shaker. The contents of the four flasks were then combined to inoculate a fermenter containing 80 l. of a medium prepared according to the following formula:

| | | |
|---|---|---|
| Glycerol | 5.0% | w/v |
| Calcium carbonate | 0.1% | w/v |
| Potassium dihydrogen orthophosphate | 0.024% | w/v |
| Magnesium sulphate . 7H$_2$O | 0.02% | w/v |
| Minor element concentrate | | |
| (as described above) | 0.1% | w/v |
| Peptone (Difco-trade mark) | 0.5% | w/v |
| Deionised water to | 100 | | and sterilised by autoclaving at 15 p.p.s.i. for ½ hour. The fermenter contents were stirred at 32° C. for 45 hours, using a turbine with 6 flat blades rotating at 260 r.p.m., and aerating at a rate of 40 l. per minute. Polypropylene glycol was added as necessary to suppress foaming. The fermentation broth was filtered and the filtrate (pH ~ 7.3) was extracted with ethyl acetate (25 l.), which was then discarded. The aqueous phase was adjusted to pH 3.5 with 5 N hydrochloric acid, and extracted with ethyl acetate (2 × 25 l.). The ethyl acetate extracts were combined, dried with sodium sulphate and filtered, and the filtrate was concentrated under reduced pressure to a volume of 1 l. The required product may be obtained from the above concentrate by either of two procedures, as follows:

A. The ethyl acetate concentrate was washed with dilute sodium bicarbonate solution (500 ml. water with sufficient saturated sodium bicarbonate solution to give a pH of between 8 and 9). The aqueous phase was separated and washed with chloroform (1 l.) which was discarded. The aqueous phase was then adjusted to pH 3.5 by adding dilute hydrochloric acid, washed with diethyl ether (2 × 1 l.) which was discarded, and extracted with ethyl acetate (2 × 1 l.). The ethyl acetate extracts were combined, dried with sodium sulphate and filtered, the filtrate was evaporated to dryness, and the residue was triturated with diethyl ether to give a crude mixture of mithramycins as a yellow-brown solid.

B. The ethyl acetate concentrate was evaporated to dryness to a crude gum. The gum (11 g.) was dissolved in methanol and the solution was absorbed onto kieselguhr (about 2 g.). The solvent was evaporated and the dried material was applied at the top of a column of kieselguhr (40 × 6.5 cm.) made up with chloroform. The column was eluted with chloroform, and 15 ml. fractions were collected. The fractions were examined by thin-layer chromatography on silica gel plate Merck 254 eluting with a 84:8:8 by volume mixture of chloroform/methanol/98% v/v formic acid, for the presence of the required mithramycin products, and fractions 50 to 250 containing this product were combined and evaporated to dryness to give a crude mixture of mithramycins as a yellow-brown solid (1.9 g.).

EXAMPLE 2

A solution of the crude mixture of mithramycins from Example 1 (3.4 g.) in aqueous methanol was applied to the top of a pre-swollen column (28 × 5 cm.) of cross-linked dextran (Sephadex G-25-trade mark), and the column was eluted with water. Mithramycin passes down the column as a greenish-yellow, fast moving band, and the appropriate fraction of the eluant is collected. Either:

A. the eluant was freeze-dried to give mixed mithramycins as a yellow, lyophilised solid (2.5 g.); or
B. the eluant was adjusted to pH 3.5 with dilute hydrochloric acid and extracted with ethyl acetate, and the extract was dried and evaporated to dryness to give mixed mithramycins as a yellow powder (2.3 g.), m.p. 169°–172° C.

The mixed mithramycins thus obtained may be converted to a magnesium chelate of the major component, as follows:

"Florisil" (trade mark) magnesium silicate (6 g.) was added to a solution of mixed mithramycins (400 mg.) in ethyl acetate, and the ethyl acetate was then evaporated. The "Florisil" containing the adsorbed mixed mithramycins was applied to the top of a column (40 cm. × 2 cm.) packed with "Florisil", and the column was eluted successively with:

(i) ethyl acetate,
(ii) 5% v/v methanol in ethyl acetate,
(iii) 10% v/v methanol in ethyl acetate,
(iv) 15% v/v methanol in ethyl acetate.

Fractions (iii) and (iv) were combined, the solvents were evaporated, and the residue was crystallised from methanol/ethyl acetate to give a magnesium chelate as yellow crystals, m.p. 210°–217° C. (decomposition), $[\alpha]_D^{23} = +85°$ (C = 0.5 in methanol). Analysis: Found, C = 56.0, H = 7.2. Calculated for $(C_{52}H_{75}O_{24})_2Mg.2H_2O$, C = 56.0, H = 7.0%. These data agree closely with those described in U.S. Pat. No. 3,906,093 for the magnesium chelate of mithramycin A obtained from fermentation of Streptomyces argillaceus ATCC 12956 or S. plicatus ATCC 12957.

EXAMPLE 3

A solution of the crude mixture of mithramycins (from Example 1, 250 mg.) was dissolved in the minimum quantity of methanol, and applied to the top of a column of silica gel (25 × 2 cm.) made up using the bottom phase of a mixture of equal volumes of chloroform, methanol and ammonium hydroxide solution. The same bottom phase mixture was used to elute the column, and the major yellow band was collected. The solvent was evaporated to give a yellow powder, which was dissolved in water (10 ml.), the solution was adjusted to pH. 3.5 using dilute hydrochloric acid, and extracted with ethyl acetate (2 × 15 ml.). The ethyl acetate extracts were evaporated to dryness, giving mixed mithramycins as a yellow powder (100 mg.) m.p. 169°–172° C.

EXAMPLE 4

Groups of 20 randomised 1-day old chickens were place in small floor pens, bedded with wood shavings and provided with automatic drinking fountains. The birds in 16 randomly chosen such pens were fed for 6 days on a nutritionally balanced control diet containing no known growth promoter, and the birds in other pens (four pens per treatment diet) were fed for the same period on the same basal diet to which the indicated weight of mixed mithramycins obtained as in Example 2 or 3, or a known chicken growth promoter, penicillin or nitrovin as a positive control, was added. At the end of the test period, the mean weight per bird in the control group and each test group was determined and the percentage weight increase for each test group as compared with the control group was calculated. The following results were obtained:

| Diet | Mean final weight per bird (g.) | % effect v. control |
| --- | --- | --- |
| Basal diet - control | 38.15 | — |
| Basal diet + penicillin 25 ppm | 42.57* | 11.6 |
| Basal diet + nitrovin 10 ppm | 42.99* | 12.7 |
| Basal diet + mixed mithramycins 25 ppm | 48.12* | 26.1 |
| Basal diet + mixed mithramcyins 10 ppm | 46.12* | 20.9 |

*Significant at $p < 0.001$ level.

EXAMPLE 5

In a further growth trial, the procedure described in Example 4 was repeated. In this case, the weights are expressed as the mean total weight of a pen of 20 birds. The following results were obtained:

| Diet | Mean final weight-20 birds (g.) | % effect v. control |
| --- | --- | --- |
| Basal diet - control | 740 | — |
| Basal diet + penicillin 25 ppm | 876 | 18.25 |
| Basal diet + nitrovin 10 ppm | 826 | 11.6 |
| Basal diet + mixed mithramycins 25 ppm | 984 | 32.8 |
| Basal diet + mixed mithramycins 10 ppm | 926 | 24.6 |
| Basal diet + mixed mithramycins 5 ppm | 825 | 11.5 |
| Basal diet + mixed mithramycins 2.5 ppm | 792 | 7.0 |

EXAMPLE 6

In a further growth trial, the procedure described in Example 5 was repeated, but in this case, all the diets were pelletted by a simple compression process. The following results were obtained:

| Diet | Mean final weight-20 birds (g.) | % effect v. control |
| --- | --- | --- |
| Basal diet - control | 774 | — |
| Basal diet + mixed mithramycins 25 ppm | 1063 | 37.2 |
| Basal diet + mixed mithramycins 10 ppm | 1047 | 35.3 |
| Basal diet + mixed mithramycins 5 ppm | 920 | 18.9 |
| Basal diet + mixed mithramycins 2.5 ppm | 856 | 10.4 |

EXAMPLE 7

The procedure described in Example 4 was repeated, using the mixed mithramycins obtained by culturing *Streptomyces argillaceus* A.T.C.C. 12956 in known manner, and the following results were obtained:

| Diet | Mean final weight per birds (g.) | % effect v. control |
| --- | --- | --- |
| Basal diet - control | 40.1 | — |
| Basal diet + penicillin 25 ppm | 47.6 | 18.8 |
| Basal diet + nitrovin 10 ppm | 45.2 | 12.9 |
| Basal diet + mixed mithramycins 25 ppm | 46.4 | 15.9 |

EXAMPLE 8

The procedure described in Example 4 was repeated, using the magnesium chelate described at the end of Example 2, and the following results were obtained:

| Diet | Mean final weight per bird (g.) | % effect v. control |
| --- | --- | --- |
| Basal diet - control | 41.30 | — |
| Basal diet - penicillin 25 ppm | 47.95* | 16.1* |
| Basal diet + nitrovin 10 ppm | 45.67* | 10.6* |
| Basal diet + Mg. chelate 10 ppm | 49.65* | 20.2* |
| Basal diet + Mg. chelate 5 ppm | 47.97* | 16.2* |
| Basal diet + Mg. chelate 2.5 ppm | 43.65** | 5.7** |

*$P < 0.001$;
**$P < 0.01$

EXAMPLE 9

The procedure described in Example 4 was repeated, using the magnesium chelate of mithramycin A, obtained in known manner from fermentation of *S. argillaceus* A.T.C.C. 12956, and the following results were obtained:

| Diet | Mean final weight per bird (g.) | % effect v. control |
| --- | --- | --- |
| Basal diet - control | 41.30 | — |
| Basal diet + penicillin 25 ppm | 47.95* | 16.1* |
| Basal diet + nitrovin 10 ppm | 45.67* | 10.6* |
| Basal diet + Mg. chelate 10 ppm | 48.69* | 17.9* |
| Basal diet + Mg. chelate 5 ppm | 46.38* | 12.3* |
| Basal diet + Mg. chelate 2.5 ppm | 43.75** | 5.9** |

*$P < 0.001$;
**$P < 0.01$

EXAMPLE 10

The procedure described in Example 4 was repeated using 4 pens each of 30 discard cockerels for each diet, and allowing the trial to run for 4 weeks. The following results were obtained:

| Diet | Mean final weight per bird(g) | Food conversion ratio |
| --- | --- | --- |
| Basal diet - control | 329 | 1.876 |
| Basal diet + nitrovin 10 ppm. | 339 | 1.800** |

-continued

| Diet | Mean final weight per bird(g) | Food conversion ratio |
| --- | --- | --- |
| Basal diet + mixed mithramycins 10 ppm. | 360* | 1.782** |
| Basal diet + mixed mithramycins 5 ppm | 360* | 1.789** |

*significant at the p <0.01 level
**significant at the p <0.001 level.

EXAMPLE 11

Seventy-two pigs weighing approximately 20kg. each were allocated into 8 matched treatment groups of 9 pigs, on the basis of sex and live weight. Each treatment group was allocated to one particular diet, and each animal in each group was fed individually on its appropriate diet, accurately weighed according to a feeding scale based on live weight, and adjusted weekly. The daily live weight gain in gammes (DLWG) and food conversion ratio (FCR — the ratio of kg. feed per kg. of live weight gain) were determined for each group at the end of a 9 week trial period. The following results were obtained:

| Diet | DLWG | FCR |
| --- | --- | --- |
| Low copper diets | | |
| Basal diet-control | 522.9 | 2.564 |
| Basal diet + nitrovin 10 ppm | 567.0 | 2.381 |
| Basal diet + carbadox 20 ppm | 630.6* | 2.292 |
| Basal diet + mixed mithramycins 25 ppm | 640.2** | 2.201* |
| High copper diets | | |
| Basal diet-control | 575.2 | 2.349 |
| Basal diet + nitrovin 10 ppm | 579.2 | 2.308 |
| Basal diet + carbadox 20 ppm | 672.7*** | 2.184* |
| Basal diet + mixed mithramycins 25 ppm | 612.8* | 2.245* |

*significant at the p <0.05 level
**significant at the p <0.01 level.

EXAMPLE 12

The procedure described in Example 4 was repeated, using chromomycin $A_3$, obtained from Takeda Chemical Industries Ltd., Osaka, Japan, instead of the mixed mithramycins. The following results were obtained:

| Diet | Mean final weight per bird (g.) | % effect v. control |
| --- | --- | --- |
| Basal diet-control | 41.46 | |
| Basal diet + penicillin 25 ppm | 46.73* | 12.7 |
| Basal diet + nitrovin 10 ppm | 45.46* | 9.7 |
| Basal diet + chromomycin $A_3$ 10 ppm | 43.68*** | 5.4 |
| Basal diet + chromomycin $A_3$ 5 ppm | 44.51** | 7.3 |

*significant at the p<0.001 level
**significant at the p<0.01 level
***significant at the p<0.05 level.

EXAMPLE 13

The crystalline magnesium chelate (4.2g.) from Example 2 was dissolved in water (100ml.) and the pH adjusted to 3.0 by careful addition of 0.1N hydrochloric acid. The acidified solution was then extracted with ethyl acetate (2 × 100ml.), the extract was dried ($Na_2SO_4$) and the solvent was evaporated to give a yellow gum. On trituration with ether the gum gave a yellow powder (2.5g.), which was crystallised from ethyl acetate and dried at 100° C., under high vacuum to give material, m.p. 173°–176° C. which was identical with mithramycin A by infra-red and n.m.r. spectroscopy and high pressure liquid chromatography (HPLC).

EXAMPLE 14

1 Liter of fermentation both, obtained as described in Example 1 was skaken with 20% sodium chloride solution, the pH was adjusted to 3.5, and the mixture was extracted with methyl ethyl ketone (2 × 300ml.). The extracts were combined and dried, concentrated to 10ml., and back extracted with saturated aqueous sodium bicarbonate solution (2ml.). The aqueous phase was then treated with methanol (5ml.) to give a fine precipitate of mithramycin sodium salt (30mg.).

EXAMPLE 15

Premixes suitable for dilution with an animal foodstuff may be manufactured by incorporating 1, 5, 10, 25 or 50g. of mixed mithramycins in a standard broiler ckicken diet comprising ground maize and fishmeal, with added lysine, methionine, vitamins and minerals so that the final weight is 500g.

Other premixes may be manufactured similarly, replacing the mixed mithramycins by any other compound of the aureolic acid group.

EXAMPLE 16

Premixes suitable for dilution with an animal foodstuff may be manufactured by the process described in Example 15, using ground limestone in place of the standard broiler chicken diet.

EXAMPLE 17

A foodstuff suitable for direct feeding to poultry may be obtained by intimately mixing 500g. of a premix, obtained as described in Example 15 or 16, with 4.5kg. of standard broiler chicken diet, and then uniformly mixing the mixture so obtained with 995kg. of standard broiler chicken diet to obtain a poultry foodstuff containing 1, 5, 10, 25 or 50g. of a compound of the aureolic acid group per tonne, depending upon the concentration of the compound in the premix used.

What we claim is:

1. A method for improving the growth rate of meat-producing domestic animals or for improving the efficiency of the utilization of animal foodstuffs by said animals which comprises orally administering to an animal, in need of said improvement an effective amount of a member of the aureolic acid group selected from (1) mithramycins A, B, or C; (2) aburamycins A, B, C, or D; (3) olivomycins A, B, C, or D; (4) variamycin; or (5) the ammonium, alkali metal, alkaline earth metal and transition metal salts, complexes and chelates of one of (1)–(4) or mixtures thereof.

2. The method of claim 1 wherein the normal nutritionally balanced solid diet is supplemented with from 0.0001 to 0.005% w/w of the member of the aureolic acid group.

3. The method of claim 1 wherein the member of the aureolic acid group is the sodium or magnesium salt, chelate or complex, of mithramycin A.

4. The method of claim 1 wherein the member of the aureolic acid group is a mixture of two or three of the mithramycins A, B and C.

5. A composition for oral administration to a meat-producing domestic animal to improve the growth rate of the animals or to improve the efficiency of their utilization of animal foodstuffs, which comprises an effective amount of a compound of the aureolic acid group selected from (1) mithramycins A, B, or C; (2) aburamycins A, B, C, or D; (3) olivomycins A, B, C, or D; (4) varimycin; or (5) the ammonium, alkali metal, alkaline earth metal and transition metal salts, complexes and chelates of one of (1)–(4) or mixtures thereof, said member being in admixture with a nutritionally-balanced animal foodstuff.

6. A concentrated premix for dilution with a conventional animal foodstuff to produce a supplemented foodstuff suitable for direct feeding to animals, said premix containing from 0.005 to 50% w/w of a member of the aureolic acid group selected from (1) mithramycins A, B, or C; (2) aburamycins A, B, C, or D; (3) olivomycins A, B, C, or D; (4) variamycin; or (5) the ammonium, alkali metal, alkaline earth metal and transition metal salts, complexes and chelates of one of (1)–(4) or mixtures thereof, said member being admixed with either a nutritionally-balanced animal foodstuff, kaolin, talc, calcium carbonate, fuller's earth, attapulgus clay, ground oyster shells or ground limestone.

* * * * *